(12) United States Patent
Xu et al.

(10) Patent No.: US 8,958,219 B2
(45) Date of Patent: Feb. 17, 2015

(54) NON-ISOLATED INVERTER AND RELATED CONTROL MANNER THEREOF AND APPLICATION USING THE SAME

(75) Inventors: Ming Xu, Nanjing (CN); Chuan-Yun Wang, Nanjing (CN)

(73) Assignees: FSP Technology Inc., Taoyuan County (TW); FSP-Powerland Technology Inc., Nanjing (CN)

( * ) Notice: Subject to any disclaimer, the term of this patent is extended or adjusted under 35 U.S.C. 154(b) by 210 days.

(21) Appl. No.: 13/615,636

(22) Filed: Sep. 14, 2012

(65) Prior Publication Data
US 2013/0070504 A1 Mar. 21, 2013

(30) Foreign Application Priority Data

Sep. 15, 2011 (CN) .......................... 2011 1 0272759

(51) Int. Cl.
| | |
|---|---|
| H02M 7/48 | (2006.01) |
| H02M 7/5388 | (2007.01) |
| H02J 3/38 | (2006.01) |
| H02M 7/493 | (2007.01) |
| H02M 1/12 | (2006.01) |

(52) U.S. Cl.
CPC .............. *H02M 7/5388* (2013.01); *H02J 3/383* (2013.01); *H02M 7/493* (2013.01); *H02M 2001/123* (2013.01); *Y02E 10/563* (2013.01)
USPC .............................................. 363/41; 363/98

(58) Field of Classification Search
CPC .............................................. H02M 2001/123
USPC ................................. 363/41, 98, 132, 97, 131
See application file for complete search history.

(56) References Cited

U.S. PATENT DOCUMENTS

| | | | | |
|---|---|---|---|---|
| 5,021,936 A | * | 6/1991 | Nishizawa et al. | 363/41 |
| 8,270,191 B2 | * | 9/2012 | Zhu et al. | 363/132 |
| 8,385,092 B1 | * | 2/2013 | Shekhawat | 363/56.04 |
| 2010/0149846 A1 | * | 6/2010 | Tan et al. | 363/132 |

FOREIGN PATENT DOCUMENTS

| | | | |
|---|---|---|---|
| CN | 101388617 B | | 3/2009 |
| JP | 60200770 A | * | 10/1985 |

OTHER PUBLICATIONS

"Office Action of Taiwan Counterpart Application", issued on Sep. 10, 2014, p. 1-p. 5.

* cited by examiner

*Primary Examiner* — Harry Behm
(74) *Attorney, Agent, or Firm* — Jianq Chyun IP Office

(57) ABSTRACT

A non-isolated inverter including a DC input-side, a capacitor connected in parallel with the DC input-side, an AC output-side connected in parallel with a load, and first and second bridge-arm units is provided. The first and second bridge-arm units are connected in parallel with the capacitor. The first bridge-arm unit includes a series forward-connection of upper and lower switch-elements, where a common-node of upper and lower switch-elements and a supplying terminal of the second bridge-arm unit are respectively connected to two terminals of the AC output-side. The upper and lower switch-elements are respectively turned on in positive and negative half cycles of an output current of the non-isolated inverter, and the generation of common-mode currents in the non-isolated inverter is suppressed under a clamping action between the upper and lower switch-elements due to there are no high-frequency voltages on the parasitic-capacitors from the non-isolated inverter to the ground.

14 Claims, 8 Drawing Sheets

NON-ISOLATED INVERTER AND RELATED CONTROL MANNER THEREOF AND APPLICATION USING THE SAME

CROSS-REFERENCE TO RELATED APPLICATION

This application claims the priority benefit of China application serial no. 201110272759.1, filed on Sep. 15, 2011. The entirety of the above-mentioned patent application is hereby incorporated by reference herein and made a part of this specification.

BACKGROUND OF THE INVENTION

1. Field of the Invention

The present invention relates to a power conversion technology, more particularly, to a non-isolated inverter and a related control manner thereof and an application using the same.

2. Description of the Related Art

Inverter is a power conversion apparatus, and is usually configured to convert a DC input power into an AC output power by switching multiple power semiconductor devices such as SCRs, GTOs, GTRs, IGBTs or power MOSFETs.

An isolated photovoltaic (PV) grid-connected inverter with power-frequency or high-frequency transformer is generally applied in a PV grid-connected system, so as to ensure the electrical isolation between the power-grid and the PV grid-connected system, and thus providing the personal protection and avoiding the common-mode currents (i.e., leakage currents) between the PV grid-connected system and the ground. However, the power-frequency transformer has the disadvantage of large volume, heavy weight and high cost. On the other hand, the power conversion circuit would be divided into multiple stages if the high-frequency transformer is applied, such that the power conversion circuit has the complexity of control, so as to reduce the system efficiency.

In order to overcome the problem of the isolated PV grid-connected system with the transformer, a transformer-less non-isolated inverter is developed. A transformer-less non-isolated single-phase PV grid-connected inverter has the advantage of small volume, high efficiency and low cost, wherein the most outstanding advantage is that the system efficiency can be increased to 97% to 98%. Accordingly, the transformer-less non-isolated inverter topology is very suitable for the high cost PV power generation grid-connected system, such that the transformer-less non-isolated inverter topology is widely applied in the small-power PV grid-connected system. However, in the transformer-less non-isolated PV grid-connected system, there are electrical connections between the power-grid and the PV array. Since the parasitic capacitors exist between the PV array and the ground, the common-mode currents (i.e. leakage currents) would be generated, such that the electromagnetic interference (EMI) and the potential safety hazard would be increased.

SUMMARY OF THE INVENTION

In order to solve the problems mentioned in the above "BACKGROUND OF THE INVENTION", the invention is directed to a non-isolated inverter capable of efficiently suppressing the generation of the common-mode currents in the non-isolated inverter, and a related control manner thereof and an application using the same (for example, a PV grid-connected system, but not limited thereto).

An exemplary embodiment of the invention provides a non-isolated inverter including a DC input-side, a capacitor, an AC output-side, a first bridge-arm unit and a second bridge-arm unit. The capacitor is connected in parallel with the DC input-side. The AC output-side is connected in parallel with a load. An upper terminal of the first bridge-arm unit is connected to a first terminal of the capacitor, and a lower terminal of the first bridge-arm unit is connected to a second terminal of the capacitor. The first bridge-arm unit includes a series forward-connection of a first upper switch-element and a first lower switch-element. The series forward-connection of the first upper switch-element and the first lower switch-element is connected between the upper and the lower terminals of the first bridge-arm unit, and a common-node of the first upper switch-element and the first lower switch-element is connected to a first terminal of the AC output-side.

An upper terminal of the second bridge-arm unit is connected to the first terminal of the capacitor, a lower terminal of the second bridge-arm unit is connected to the second terminal of the capacitor, and a supplying terminal of the second bridge-arm unit is connected to a second terminal of the AC output-side. In a positive half cycle of an output current of the non-isolated inverter, the first lower switch-element is turned on, and the first upper switch-element is turned off. In a negative half cycle of the output current of the non-isolated inverter, the first upper switch-element is turned on, and the first lower switch-element is turned off. In this case, the generation of common-mode currents in the non-isolated inverter is suppressed under a clamping action between the first upper switch-element and the first lower switch-element.

In an exemplary embodiment of the invention, the second bridge-arm unit includes a first set of second bridge-arm sub-unit. The first set of second bridge-arm sub-unit includes a first inductor and a series forward-connection of a second upper switch-element and a second lower switch-element. The series forward-connection of the second upper switch-element and the second lower switch-element is connected between the upper and lower terminals of the second bridge-arm unit. A common-node of the second upper switch-element and the second lower switch-element is connected to a first terminal of the first inductor, and a second terminal of the first inductor is connected to the supplying terminal of the second bridge-arm unit.

In an exemplary embodiment of the invention, the first to the second upper switch-elements and the first to the second lower switch-elements are all switch-tubes, and the switch-tubes may be implemented by controllable switches. In this case, the non-isolated inverter may further include a control circuit. The control circuit is configured to control a switching of the first to the second upper switch-elements and the first to the second switch-elements in response to an input voltage signal of the DC input-side, an output voltage signal of the AC output-side and an inductor current signal of the first inductor. The control circuit may be at least implemented by a digital signal processor, and the control circuit controls the non-isolated inverter under a critical inductor current mode (CRM).

In an exemplary embodiment of the invention, in case that the first to the second upper switch-elements and the first to the second lower switch-elements are all switch-tubes, in the positive half cycle of the output current of the non-isolated inverter, a current of the first inductor is increased when the first lower switch-element and the second upper switch-element are turned on, and the first upper switch-element and the second lower switch-element are turned off. In the positive half cycle of the output current of the non-isolated inverter, the current of the first inductor is decreased when the first and the second lower switch-elements are turned on, and the first and the second upper switch-elements are turned off. In the negative half cycle of the output current of the non-isolated inverter, the current of the first inductor is increased when the first upper switch-element and the second lower switch-element are turned on, and the first lower switch-element and the second upper switch-element are turned off. In the negative half cycle of the output current of the non-isolated inverter, the current of the first inductor is decreased when the first and the second upper switch-elements are turned on, and the first and the second lower switch-elements are turned off.

In an exemplary embodiment of the invention, each of the switch-tubes corresponding to the second upper switch-element and the second lower switch-element may include an insulated gate bipolar transistor (IGBT) and a fast-recovery diode both connected in parallel.

In an exemplary embodiment of the invention, the second bridge-arm unit further includes a second set of second bridge-arm sub-unit connected in parallel with the first set of second bridge-arm sub-unit. The second set of second bridge-arm sub-unit includes a second inductor and a series forward-connection of a third upper switch-element and a third lower switch-element. The series forward-connection of the third upper switch-element and the third lower switch-element is connected between the upper and lower terminals of the second bridge-arm unit. A common-node of the third upper switch-element and the third lower switch-element is connected to a first terminal of the second inductor, and a second terminal of the second inductor is connected to the supplying terminal of the second bridge-arm unit.

In an exemplary embodiment of the invention, the first to the third upper switch-elements and the first to the third lower switch-elements are all switch-tubes, and the switch-tubes are implemented by controllable switches. In this case, the non-isolated inverter may further include a control circuit. The control circuit is configured to control a switching of the first to the third upper switch-elements and the first to the third lower switch-elements in response to an input voltage signal of the DC input-side, an output voltage signal of the AC output-side and inductor current signals of the first and the second inductors. Similarly, the control circuit may be at least implemented by a digital signal processor, and the control circuit controls the non-isolated inverter under a critical inductor current mode (CRM).

In an exemplary embodiment of the invention, the first upper switch-element and the first lower switch-element are switch-tubes. One of the second upper switch-element and the second lower switch-element and one of the third upper switch-element and the third lower switch-element are diodes, and the other one of the second upper switch-element and the second lower switch-element and the other one of the third upper switch-element and the third lower switch-element are switch-tubes.

In an exemplary embodiment of the invention, the second upper switch-element and the third lower switch-element are diodes, and the second lower switch-element and the third upper switch-element are switch-tubes; and all of the switch-tubes are implemented by controllable switches. In this case, the non-isolated inverter may further include a control circuit. The control circuit is configured to control a switching of the first and the third upper switch-elements and the first and the second lower switch-elements in response to an input voltage signal of the DC input-side, an output voltage signal of the AC output-side and inductor current signals of the first and the second inductors. Similarly, the control circuit may be at least implemented by a digital signal processor, and the control circuit controls the non-isolated inverter under a critical inductor current mode (CRM).

In an exemplary embodiment of the invention, in case that the first upper switch-element and the first lower switch-element are switch-tubes, the second upper switch-element and the third lower switch-element are diodes, and the second lower switch-element and the third upper switch-element are switch-tubes, in the positive half cycle of the output current of the non-isolated inverter, a current of the second inductor is increased when the first lower switch-element and the third upper switch-element are turned on, and the first upper switch-element and the second lower switch-element are turned off. In the positive half cycle of the output current of the non-isolated inverter, the current of the second inductor is freewheeling through the third lower switch-element when the first lower switch-element is turned on, and the first upper, the second lower and the third upper switch-elements are turned off. In the negative half cycle of the output current of the non-isolated inverter, the current of the first inductor is increased when the first upper switch-element and the second lower switch-element are turned on, and the first lower switch-element and the third upper switch-element are turned off. In the negative half cycle of the output current of the non-isolated inverter, the current of the first inductor is freewheeling through the second upper switch-element when the first upper switch-element is turned on, and the first lower, the second lower and the third upper switch-elements are turned off.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
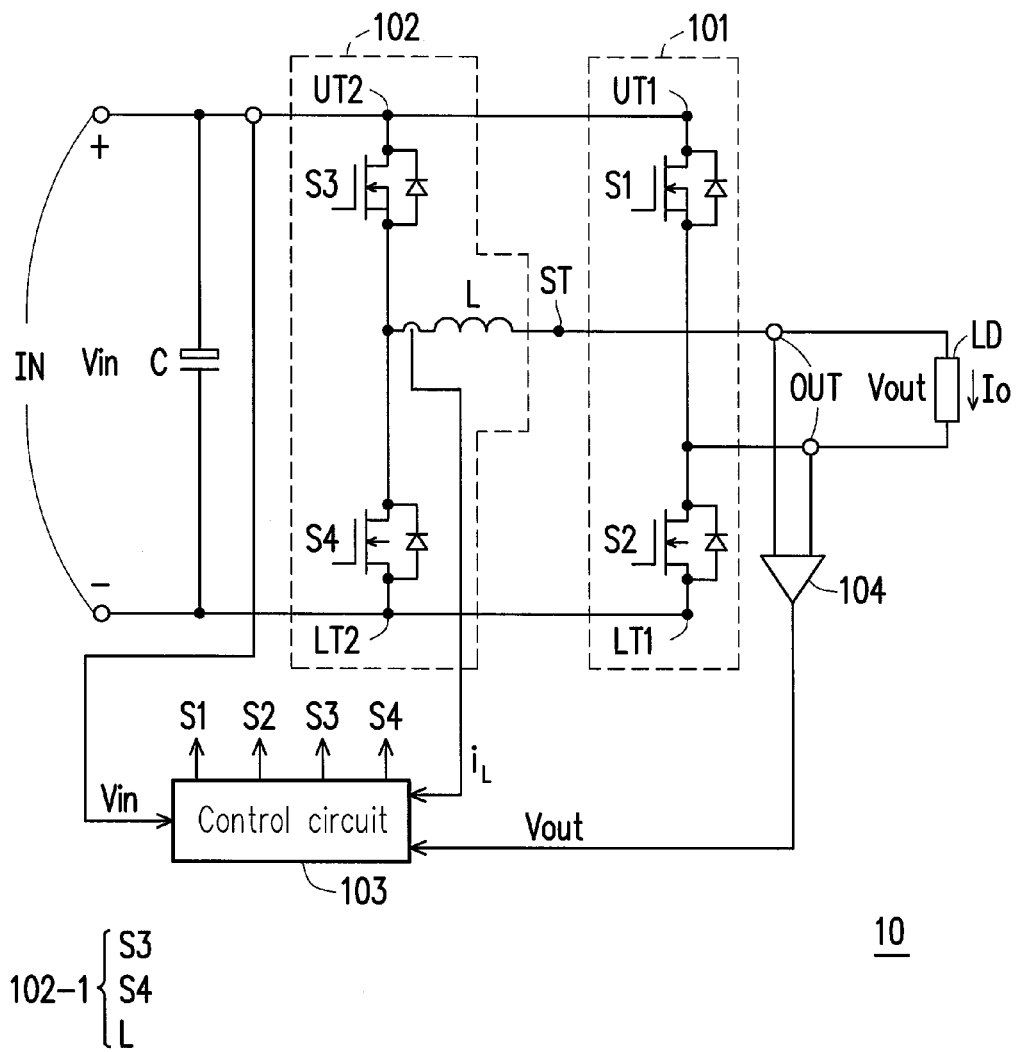
FIG. 1 is a diagram of a non-isolated inverter 10 according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a non-isolated inverter 10 according to an exemplary embodiment of the invention. Referring to FIG. 1, the non-isolated inverter 10 includes a DC input-side IN, a capacitor C, an AC output-side OUT, a first bridge-arm unit 101, a second bridge-arm unit 102, and a control circuit 103. The DC input-side IN is configured to receive a DC input power Vin. The output-side OUT is connected in parallel with a load LD, and is configured to provide an AC output power Vout to the load LD.

The capacitor C is connected in parallel with the DC input-side IN. An upper terminal UT1 of the first bridge-arm unit 101 is connected to a first terminal of the capacitor C, and lower terminal LT1 of the first bridge-arm unit 101 is connected to a second terminal of the capacitor C. In this exemplary embodiment, the first bridge-arm unit 101 includes a series forward-connection of a first upper switch-element S1 and a first lower switch-element S2. The series forward-connection of the first upper switch-element S1 and the first lower switch-element S2 is connected between the upper terminal UT1 and the lower terminal LT1 of the first bridge-arm unit 101. A common-node of the first upper switch-element S1 and the first lower switch-element S2 is connected to a first terminal of the AC output-side OUT.

An upper terminal UT2 of the second bridge-arm unit 102 is connected to the first terminal of the capacitor C, a lower terminal LT2 of the second bridge-arm unit 102 is connected to the second terminal of the capacitor C, and a supplying terminal ST of the second bridge-arm unit 102 is connected to a second terminal of the AC output-side OUT. Accordingly, it is known that the first bridge-arm unit 101 and the second bridge-arm unit 102 are connected in parallel.

In this exemplary embodiment, the second bridge-arm unit 102 includes a first set of second bridge-arm sub-unit 102-1. The first set of second bridge-arm sub-unit 102-1 includes an inductor L and a series forward-connection of a second upper switch-element S3 and a second lower switch-element S4. The series forward-connection of the second upper switch-element S3 and the second lower switch-element S4 is connected between the upper terminal UT2 and the lower terminal LT2 of the second bridge-arm unit 102. A common-node of the second upper switch-element S3 and the second lower switch-element S4 is connected to a first terminal of the inductor L, and a second terminal of the inductor L is connected to the supplying terminal ST of the second bridge-arm unit 102.

It is noted that, in this exemplary embodiment, the first to the second upper switch-elements (S1, S3) and the first to the second lower switch-elements (S2, S4) are all switch-tubes, and the switch-tubes may be implemented by controllable switches, for example, MOSFETs each with body diode, but not limited thereto.

The control circuit 103 is configured to generate the corresponding control signals Vgs (S1, S2, S3, S4) to control a switching of the first to the second upper switch-elements (S1, S3) and the first to the second lower switch-elements (S2, S4) in response to an input voltage signal of the DC input-side IN (i.e. the DC input power Vin), an output voltage signal of the AC output-side OUT (i.e. the AC output power Vout) and an inductor current signal of the inductor L (i.e. the detected inductor current signal $i_L$), where the output voltage signal of the AC output-side OUT (i.e. the AC output power Vout) may be detected by a differential detection circuit 104, but not limited thereto.

In this exemplary embodiment, the control circuit 103 may be at least implemented by a digital signal processor (DSP), but not limited thereto. In other words, the control circuit 103 may be an analog circuit configuration. Moreover, the control circuit 103 controls the non-isolated inverter 10 under a critical inductor current mode (CRM).

Figure 2:
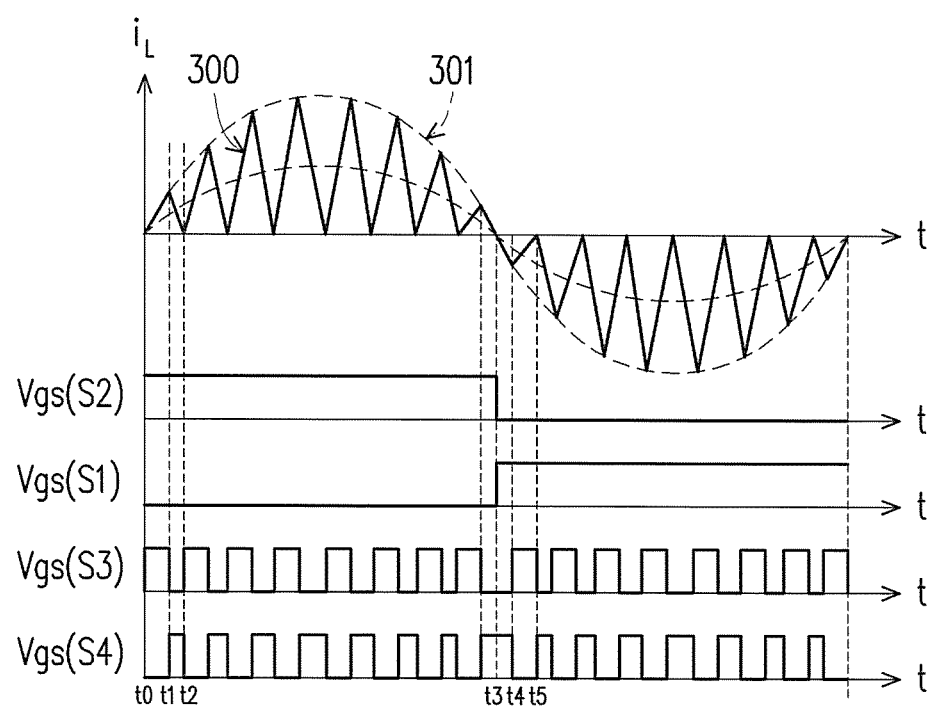
FIG. 2 is operation waveforms of the non-isolated inverter of FIG. 1.

To be specific, FIG. 2 is operation waveforms of the non-isolated inverter 10 of FIG. 1. Referring to FIGS. 1 and 2, in this exemplary embodiment, the control circuit 103 would generate an output current reference signal ($i_{ref}$) 301. Accordingly, in a positive half cycle of an output current (i.e. a load current) Io of the non-isolated inverter 10, the first lower switch-element S2 is turned on and the first upper switch-element S1 is turned off. In this case, when the detected inductor current signal $i_L$ is greater than zero and less than the output current reference signal 301, the second upper switch-element S3 is turned on and the second lower switch-element S4 is turned off, such that the current of the inductor L is increased as shown the current waveform 300. Moreover, when the detected inductor current signal $i_L$ is increased to the output current reference signal 301, the second upper switch-element S3 is turned off and the second lower switch-element S4 is turned on, such that the current of the inductor L is decreased as shown the current waveform 300. Furthermore, when the detected inductor current signal $i_L$ is decreased to zero, the second upper switch-element S3 is turned on and the second lower switch-element S4 is turned off for instance or after a predetermined delay time.

On the other hand, in a negative half cycle of the output current Io of the non-isolated inverter 10, the first upper switch-element S1 is turned on and the first lower switch-element S2 is turned off. In this case, when the detected inductor current signal $i_L$ is greater than zero and less than the output current reference signal 301, the second lower switch-element S4 is turned on and the second upper switch-element S3 is turned off, such that the current of the inductor L is increased as shown the current waveform 300. Moreover, when the detected inductor current signal $i_L$ is increased to the output current reference signal 301, the second lower switch-element S4 is turned off and the second upper switch-element S3 is turned on, such that the current of the inductor L is decreased as shown the current waveform 300. Furthermore, when the detected inductor current signal $i_L$ is decreased to zero, the second lower switch-element S4 is turned on and the second upper switch-element S3 is turned off for instance or after a predetermined delay time.

Figure 3:
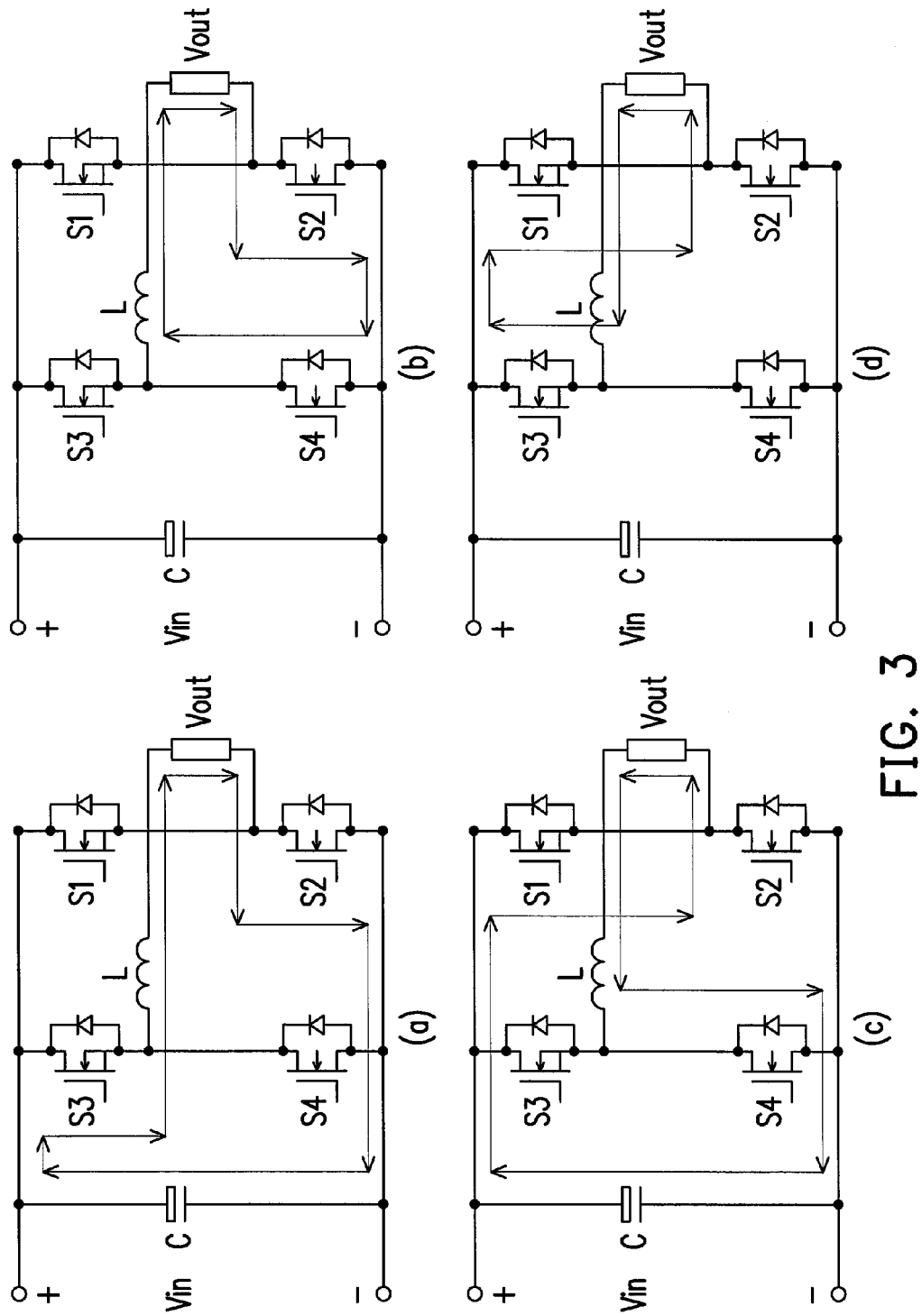
FIGS. 3(a) to 3(d) are diagrams of the non-isolated inverter 10 of FIG. 1 in different operation modes.

In order to more clearly explain the principle of the circuit topology as shown in FIG. 1, FIGS. 3(a) to 3(d) are diagrams of the non-isolated inverter 10 of FIG. 1 in different operation modes. Referring to FIGS. 3(a) to 3(d), as shown in FIG. 3(a), the first lower switch-element S2 and the second upper switch-element S3 are turned on, and the first upper switch-element S1 and the second lower switch-element S4 are turned off. In this case, the current loop is shown as the arrowed path on FIG. 3(a), and the current flowing through the inductor L may represent as $$i_L = L \frac{Vin - Vout}{dt},$$

and meanwhile, the waveform of the current ($i_L$) flowing through the inductor L can be shown as the current waveform 300 at times (t0-t1).

As shown in FIG. 3(b), at time t1, the second upper switch-element S3 is turned off, the second lower switch-element S4 is turned on, the first lower switch-element S2 is maintained to be turned on, and the first upper switch-element S1 is maintained to be turned off, and meanwhile, the current loop is shown as the arrowed path on FIG. 3(b), and the waveform of the current ($i_L$) flowing through the inductor L can be shown as the current waveform 300 at times (t1-t2), and the energy is provided from the inductor L to the load LD. In the positive half cycle of the output current Io (i.e. the load current) of the non-isolated inverter 10, the switching action of the switch-elements (S1, S2, S3, S4) at times t0-t2 is repeated until the output current Io (i.e. the load current) of the non-isolated inverter 10 enters into the negative half cycle from the positive half cycle.

As shown in FIG. 3(c), at time t3, the first upper switch-element S1 and the second lower switch-element S4 are turned on, and the first lower switch-element S2 and the second upper switch-element S3 are turned off, and meanwhile, the current loop is shown as the arrowed path on FIG. 3(c), and the waveform of the current ($i_L$) flowing through the inductor L can be shown as the current waveform 300 at times (t3-t4).

As shown in FIG. 3(d), at time t4, the second lower switch-element S4 is turned off, the second upper switch-element S3 is turned on, the first lower switch-element S2 is maintained to be turned off, and the first upper switch-element S1 is maintained to be turned on, and meanwhile, the current loop is shown as the arrowed path on FIG. 3(d), and the waveform of the current ($i_L$) flowing through the inductor L can be shown as the current waveform 300 at times (t4-t5), and the energy is provided from the inductor L to the load LD. In the negative half cycle of the output current Io (i.e. the load current) of the non-isolated inverter 10, the switching action of the switch-elements (S1, S2, S3, S4) at times t3-t5 is repeated until the output current Io (i.e. the load current) of the non-isolated inverter 10 enters into the next positive half cycle from the negative half cycle.

From the above, it is clearly known that in the positive half cycle of the output current (i.e. the load current) Io of the non-isolated inverter 10, the first lower switch-element S2 is maintained to be turned on and the first upper switch-element S1 is maintained to be turned off; moreover, in the negative half cycle of the output current (i.e. the load current) Io of the non-isolated inverter 10, the first lower switch-element S2 is maintained to be turned off and the first upper switch-element S1 is maintained to be turned on. Accordingly, the generation of common-mode currents (i.e. the leakage currents) in the non-isolated inverter 10 can be suppressed under a clamping action between the upper and lower switch-elements (S1, S2) due to there are no high-frequency voltages on the parasitic-capacitors from the non-isolated inverter 10 to the ground (or between the non-isolated inverter 10 and the ground).

Figure 4:
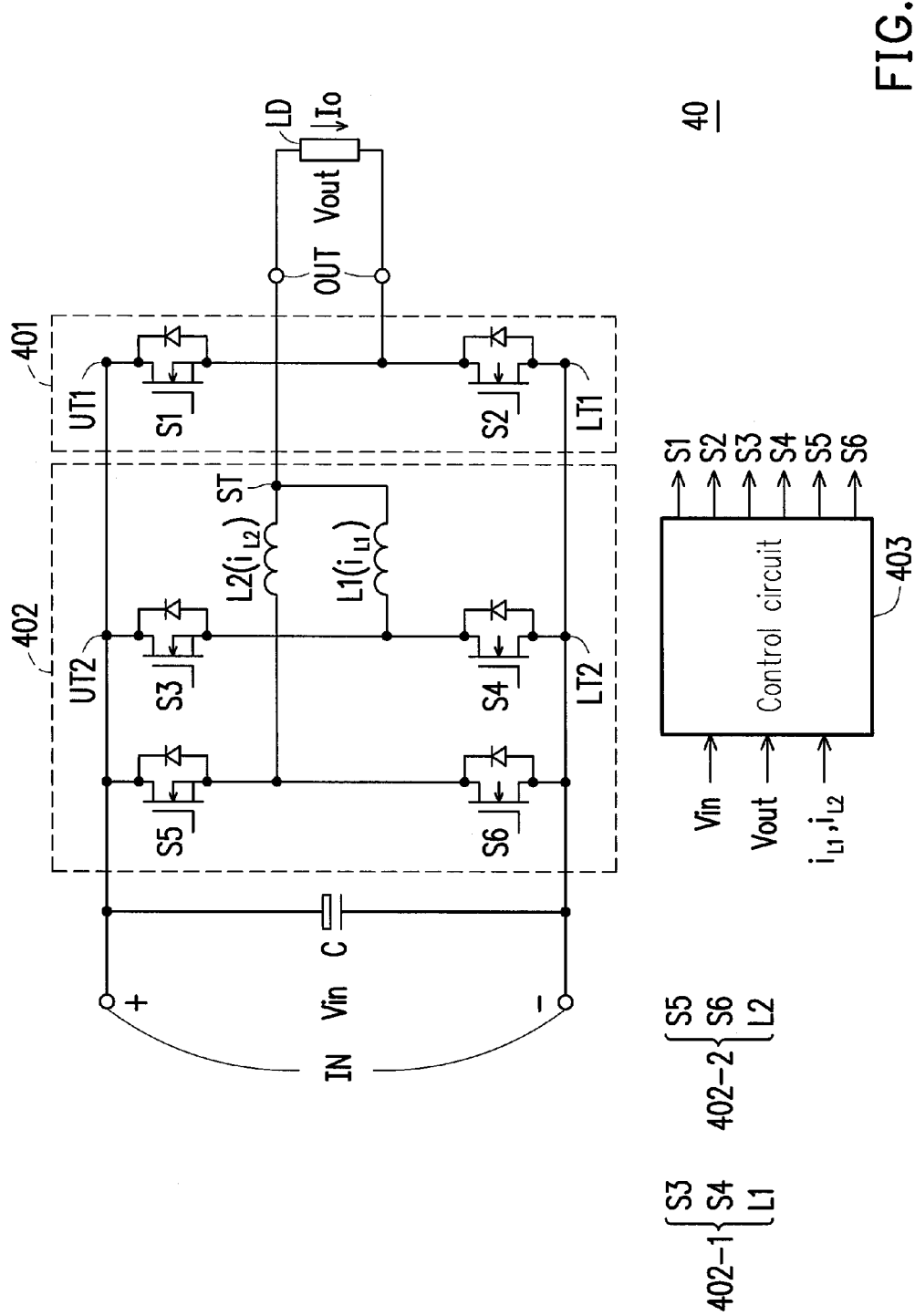
FIG. 4 is a diagram of a non-isolated inverter 40 according to another exemplary embodiment of the invention.

FIG. 4 is a diagram of a non-isolated inverter 40 according to another exemplary embodiment of the invention. Referring to FIG. 4, the non-isolated inverter 40 includes a DC input-side IN, a capacitor C, an AC output-side OUT, a first bridge-arm unit 401, a second bridge-arm unit 402, and a control circuit 403. The DC input-side IN is configured to receive a DC input power Vin. The output-side OUT is connected in parallel with a load LD, and is configured to provide an AC power Vout to the load LD.

The capacitor C is connected in parallel with the DC input-side IN. An upper terminal UT1 of the first bridge-arm unit 401 is connected to a first terminal of the capacitor C, and lower terminal LT1 of the first bridge-arm unit 401 is connected to a second terminal of the capacitor C. In this exemplary embodiment, the first bridge-arm unit 401 includes a series forward-connection of a first upper switch-element S1 and a first lower switch-element S2. The series forward-connection of the first upper switch-element S1 and the first lower switch-element S2 is connected between the upper terminal UT1 and the lower terminal LT1 of the first bridge-arm unit 401. A common-node of the first upper switch-element S1 and the first lower switch-element S2 is connected to a first terminal of the AC output-side OUT.

An upper terminal UT2 of the second bridge-arm unit 402 is connected to the first terminal of the capacitor C, a lower terminal LT2 of the second bridge-arm unit 402 is connected to the second terminal of the capacitor C, and a supplying terminal ST of the second bridge-arm unit 402 is connected to a second terminal of the AC output-side OUT. Accordingly, it is known that the first bridge-arm unit 401 and the second bridge-arm unit 402 are connected in parallel.

In this exemplary embodiment, the second bridge-arm unit 402 includes a first set of second bridge-arm sub-unit 402-1 and a second set of second bridge-arm sub-unit 402-2. The first set of second bridge-arm sub-unit 402-1 includes an inductor L1 and a series forward-connection of a second upper switch-element S3 and a second lower switch-element S4. The series forward-connection of the second upper switch-element S3 and the second lower switch-element S4 is connected between the upper terminal UT2 and the lower terminal LT2 of the second bridge-arm unit 402. A common-node of the second upper switch-element S3 and the second lower switch-element S4 is connected to a first terminal of the inductor L1, and a second terminal of the inductor L1 is connected to the supplying terminal ST of the second bridge-arm unit 402.

In addition, the second set of second bridge-arm sub-unit 402-2 is connected in parallel with the first set of second bridge-arm sub-unit 402-1. The second set of second bridge-arm sub-unit 402-2 includes an inductor L2 and a series forward-connection of a third upper switch-element S5 and a third lower switch-element S6. The series forward-connection of the third upper switch-element S5 and the third lower switch-element S6 is connected between the upper terminal UT2 and the lower terminal LT2 of the second bridge-arm unit 402. A common-node of the third upper switch-element S5 and the third lower switch-element S6 is connected to a first terminal of the inductor L2, and a second terminal of the inductor L2 is connected to the supplying terminal ST of the second bridge-arm unit 402.

It is noted that, in this exemplary embodiment, the first to the third upper switch-elements (S1, S3, S5) and the first to the second lower switch-elements (S2, S4, S6) are all switch-tubes, and the switch-tubes may be implemented by controllable switches, for example, MOSFETs each with body diode, but not limited thereto.

The control circuit 403 is configured to generate the corresponding control signals to control a switching of the first to the third upper switch-elements (S1, S3, S5) and the first to the third lower switch-elements (S2, S4, S6) in response to an input voltage signal of the DC input-side IN (i.e. the DC input power Vin), an output voltage signal of the AC output-side OUT (i.e. the AC output power Vout) and inductor current signals of the inductors L1 and L2 (i.e. the detected inductor current signals $i_{L1}$ and $i_{L2}$).

Similarly, the control circuit 403 may be at least implemented by a digital signal processor (DSP), but not limited thereto. In other words, the control circuit 403 may be an analog circuit configuration. Moreover, the control circuit 403 controls the non-isolated inverter 40 under a critical inductor current mode (CRM).

In this exemplary embodiment, since the second bridge-arm unit 402 includes two set of second bridge-arm sub-units 402-1 and 402-2 connected in parallel, so the two set of second bridge-arm sub-units 402-1 and 402-2 can be alternately activated by the control of the control circuit 403. In this case, the operation of the non-isolated inverter 40 is similar to that of the non-isolated inverter 10, such that the first upper switch-element S1 and the first lower switch-element S2 are respectively turned on in the positive and negative half cycles of the output current Io of the non-isolated inverter 40. Accordingly, the generation of common-mode currents (i.e. the leakage currents) in the non-isolated inverter 40 can be suppressed under a clamping action between the upper and lower switch-elements (S1, S2) due to there are no high-frequency voltages on the parasitic-capacitors from the non-isolated inverter 40 to the ground (or between the non-isolated inverter 40 and the ground).

Figure 5:
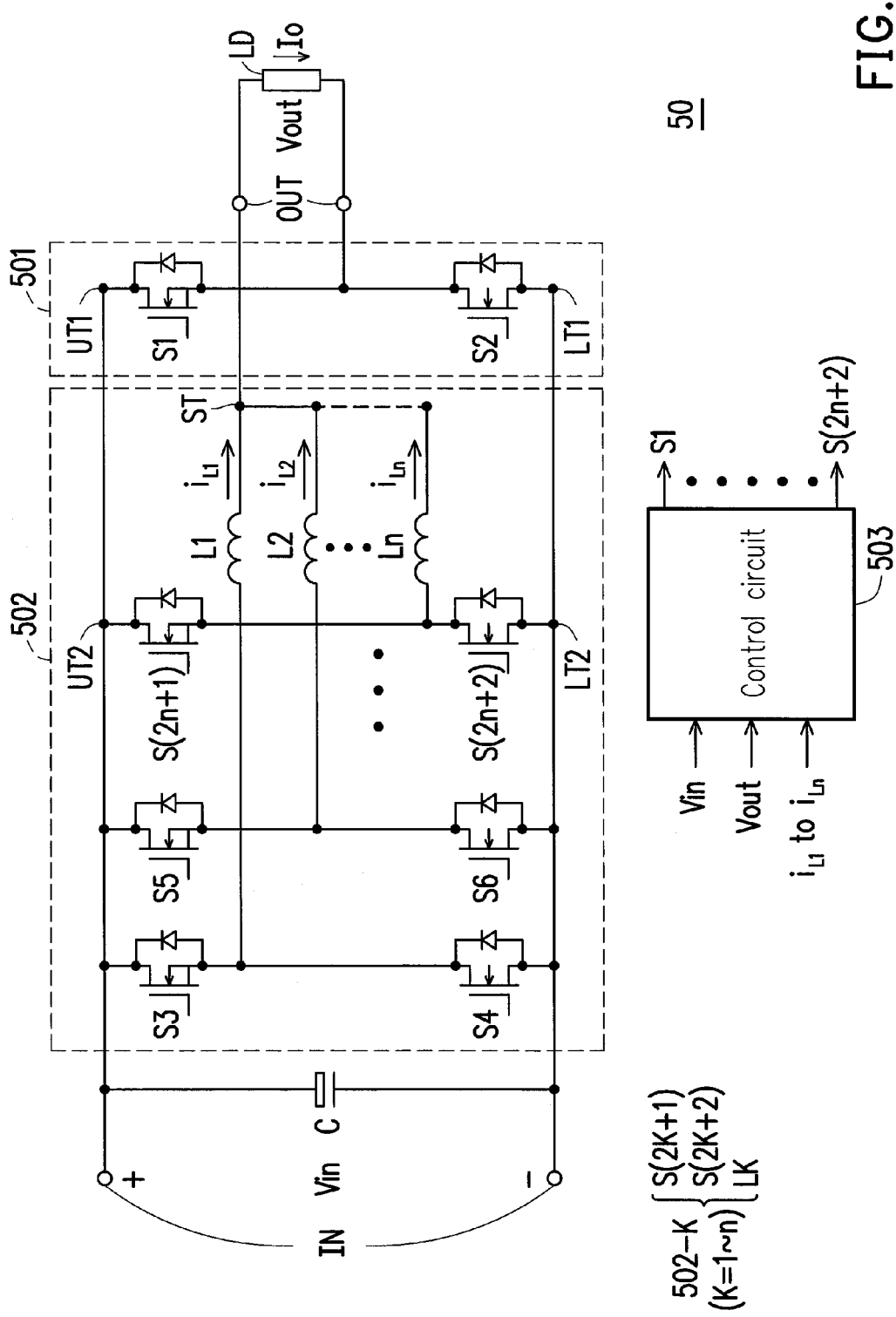
FIG. 5 is a diagram of a non-isolated inverter 50 according to another exemplary embodiment of the invention.

FIG. 5 is a diagram of a non-isolated inverter 50 according to another exemplary embodiment of the invention. Referring to FIG. 5, the non-isolated inverter 50 includes a DC input-side IN, a capacitor C, an AC output-side OUT, a first bridge-arm unit 501, a second bridge-arm unit 502, and a control circuit 503. The DC input-side IN is configured to receive a DC input power Vin. The output-side OUT is connected in parallel with a load LD, and is configured to provide an AC power Vout to the load LD.

The capacitor C is connected in parallel with the DC input-side IN. An upper terminal UT1 of the first bridge-arm unit 501 is connected to a first terminal of the capacitor C, and lower terminal LT1 of the first bridge-arm unit 501 is connected to a second terminal of the capacitor C. In this exemplary embodiment, the first bridge-arm unit 501 includes a series forward-connection of a first upper switch-element S1 and a first lower switch-element S2. The series forward-connection of the first upper switch-element S1 and the first lower switch-element S2 is connected between the upper terminal UT1 and the lower terminal LT1 of the first bridge-arm unit 501. A common-node of the first upper switch-element S1 and the first lower switch-element S2 is connected to a first terminal of the AC output-side OUT.

An upper terminal UT2 of the second bridge-arm unit 502 is connected to the first terminal of the capacitor C, a lower terminal LT2 of the second bridge-arm unit 502 is connected to the second terminal of the capacitor C, and a supplying terminal ST of the second bridge-arm unit 502 is connected to a second terminal of the AC output-side OUT. Accordingly, it is known that the first bridge-arm unit 501 and the second bridge-arm unit 502 are connected in parallel.

In this exemplary embodiment, the second bridge-arm unit 502 includes K (=1~n) set of second bridge-arm sub-units 502-K connected in parallel with each other, where n is a positive integer greater than or equal to 3. The $K^{th}$ set of second bridge-arm sub-unit 502-K includes an inductor LK and a series forward-connection of an upper switch-element S(2K+1) and a lower switch-element S(2K+2). For example, if K=1, the $1^{st}$ set of second bridge-arm sub-unit 502-1 includes an inductor L1 and a series forward-connection of an upper switch-element S3 and a lower switch-element S4; if K=2, the $2^{nd}$ set of second bridge-arm sub-unit 502-2 includes an inductor L2 and a series forward-connection of an upper switch-element S5 and a lower switch-element S6; if K=3, the $3^{rd}$ set of second bridge-arm sub-unit 502-3 includes an inductor L3 and a series forward-connection of an upper switch-element S7 and a lower switch-element S8; and so on for K=n, the $n^{th}$ set of second bridge-arm sub-unit 502-n includes an inductor Ln and a series forward-connection of an upper switch-element S(2n+1) and a lower switch-element S(2n+2).

Each series forward-connection of the upper switch-element S(2K+1) and the lower switch-element S(2K+1) is connected between the upper terminal UT2 and the lower terminal LT2 of the second bridge-arm unit 502. A common-node of the second upper switch-element S(2K+1) and the second lower switch-element S(2K+2) is connected to a first terminal of the inductor LK, and a second terminal of the inductor LK is connected to the supplying terminal ST of the second bridge-arm unit 502. For example, if K=1, the common-node of the second upper switch-element S3 and the second lower switch-element S4 is connected to a first terminal of the inductor L1, and a second terminal of the inductor L1 is connected to the supplying terminal ST of the second bridge-arm unit 502, and so on for K=n, the common-node of the second upper switch-element S(2n+1) and the second lower switch-element S(2n+2) is connected to a first terminal of the inductor Ln, and a second terminal of the inductor Ln is connected to the supplying terminal ST of the second bridge-arm unit 502.

It is noted that, in this exemplary embodiment, all of the upper and lower switch-elements S1–S(2n+2) are all switch-tubes, and the switch-tubes may be implemented by controllable switches, for example, MOSFETs each with body diode, but not limited thereto.

The control circuit 503 is configured to generate the corresponding control signals to control a switching of all of the upper and lower switch-elements S1–S(2n+2) in response to an input voltage signal of the DC input-side IN (i.e. the DC input power Vin), an output voltage signal of the AC output-side OUT (i.e. the AC output power Vout) and inductor current signals of the inductors L1-Ln (i.e. the detected inductor current signals $i_{L1}$-$i_{Ln}$).

Similarly, the control circuit 503 may be at least implemented by a digital signal processor (DSP), but not limited thereto. In other words, the control circuit 503 may be an analog circuit configuration. Moreover, the control circuit 503 controls the non-isolated inverter 50 under a critical inductor current mode (CRM).

In this exemplary embodiment, since the second bridge-arm unit 502 includes K (=1~n) set of second bridge-arm sub-units 502-1 to 502-n connected in parallel with each other, so the K set of second bridge-arm sub-units 502-1 to 502-n can be alternately activated in parallel by the control of the control circuit 503. In this case, the operation of the non-isolated inverter 50 is similar to that of the non-isolated inverter 10, such that the first upper switch-element S1 and the first lower switch-element S2 are respectively turned on in the positive and negative half cycles of the output current Io of the non-isolated inverter 50. Accordingly, the generation of common-mode currents (i.e. the leakage currents) in the non-isolated inverter 50 can be suppressed under a clamping action between the upper and lower switch-elements (S1, S2) due to there are no high-frequency voltages on the parasitic-capacitors from the non-isolated inverter 50 to the ground (or between the non-isolated inverter 50 and the ground).

Figure 6:
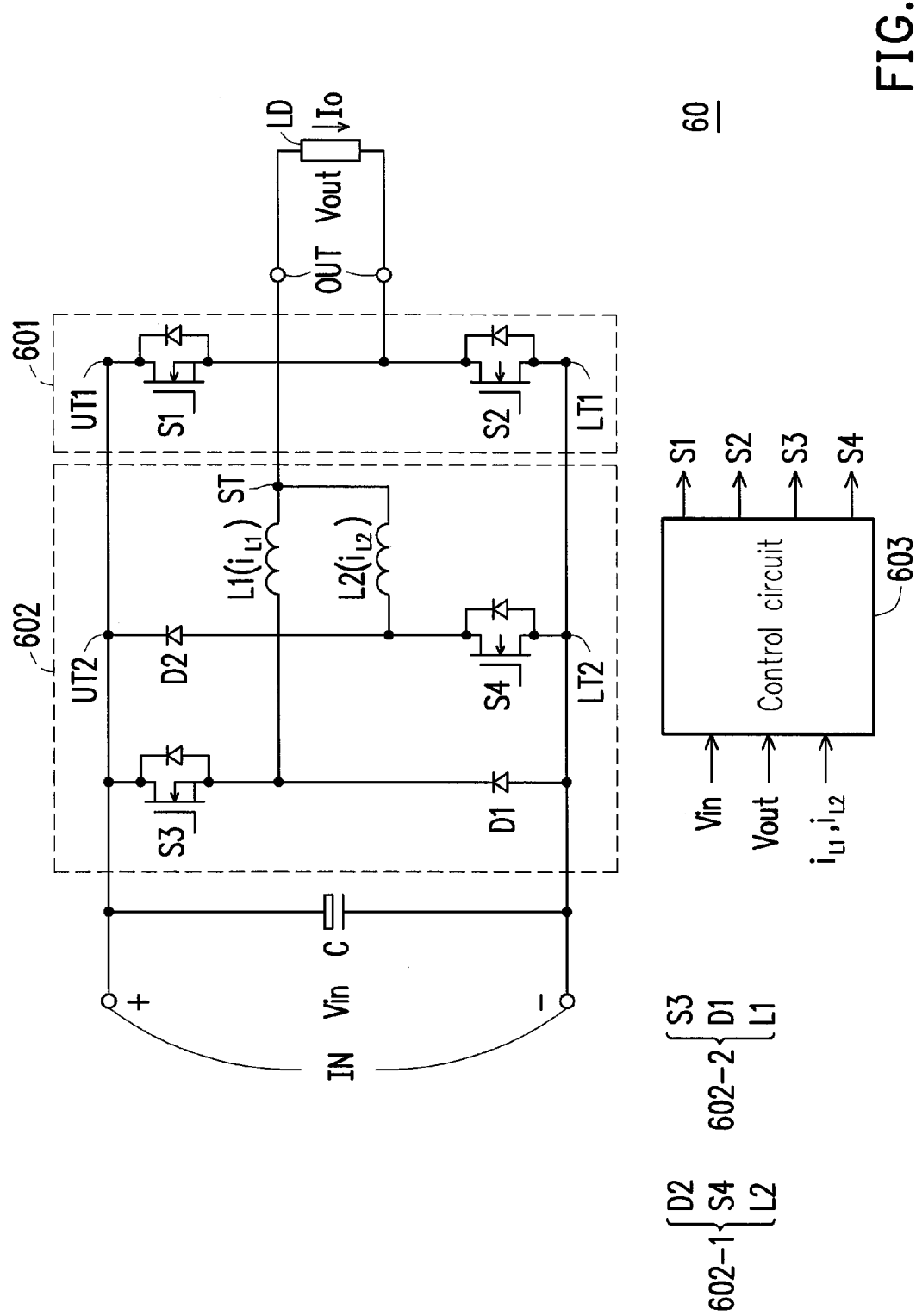
FIG. 6 is a diagram of a non-isolated inverter 60 according to another exemplary embodiment of the invention.

FIG. 6 is a diagram of a non-isolated inverter 60 according to another exemplary embodiment of the invention. Referring to FIG. 6, the non-isolated inverter 60 includes a DC input-side IN, a capacitor C, an AC output-side OUT, a first bridge-arm unit 601, a second bridge-arm unit 602, and a control circuit 603. The DC input-side IN is configured to receive a DC input power Vin. The output-side OUT is connected in parallel with a load LD, and is configured to provide an AC power Vout to the load LD.

The capacitor C is connected in parallel with the DC input-side IN. An upper terminal UT1 of the first bridge-arm unit 601 is connected to a first terminal of the capacitor C, and lower terminal LT1 of the first bridge-arm unit 601 is connected to a second terminal of the capacitor C. In this exemplary embodiment, the first bridge-arm unit 601 includes a series forward-connection of a first upper switch-element S1 and a first lower switch-element S2. The series forward-connection of the first upper switch-element S1 and the first lower switch-element S2 is connected between the upper terminal UT1 and the lower terminal LT1 of the first bridge-arm unit 601. A common-node of the first upper switch-element S1 and the first lower switch-element S2 is connected to a first terminal of the AC output-side OUT.

It is noted that, in this exemplary embodiment, the first upper switch-element S1 and the first lower switch-element S2 are all switch-tubes, and the switch-tubes may be implemented by controllable switches, for example, MOSFETs each with body diode, but not limited thereto.

An upper terminal UT2 of the second bridge-arm unit 602 is connected to the first terminal of the capacitor C, a lower terminal LT2 of the second bridge-arm unit 602 is connected to the second terminal of the capacitor C, and a supplying terminal ST of the second bridge-arm unit 602 is connected to a second terminal of the AC output-side OUT. Accordingly, it is known that the first bridge-arm unit 601 and the second bridge-arm unit 602 are connected in parallel.

In this exemplary embodiment, the second bridge-arm unit 602 includes a first set of second bridge-arm sub-unit 602-1 and a second set of second bridge-arm sub-unit 602-2. The first set of second bridge-arm sub-unit 602-1 includes an inductor L2 and a series forward-connection of a second upper switch-element D2 and a second lower switch-element S4, where the second upper switch-element D2 is a diode, and the second lower switch-element S4 may be a switch-tube implemented by controllable switch, for example, MOSFETs each with body diode, but not limited thereto. The series forward-connection of the second upper switch-element D2 and the second lower switch-element S4 is connected between the upper terminal UT2 and the lower terminal LT2 of the second bridge-arm unit 602. A common-node of the second upper switch-element D2 and the second lower switch-element S4 is connected to a first terminal of the inductor L2, and a second terminal of the inductor L2 is connected to the supplying terminal ST of the second bridge-arm unit 602.

In addition, the second set of second bridge-arm sub-unit 602-2 is connected in parallel with the first set of second bridge-arm sub-unit 602-1. The second set of second bridge-arm sub-unit 602-2 includes an inductor L1 and a series forward-connection of a third upper switch-element S3 and a third lower switch-element D1, where the third upper switch-element S3 may be a switch-tube implemented by controllable switch, for example, MOSFETs each with body diode, but not limited thereto, and the third lower switch-element D1 is a diode. The series forward-connection of the third upper switch-element S3 and the third lower switch-element D1 is connected between the upper terminal UT2 and the lower terminal LT2 of the second bridge-arm unit 602. A common-node of the third upper switch-element S3 and the third lower switch-element D1 is connected to a first terminal of the inductor L1, and a second terminal of the inductor L1 is connected to the supplying terminal ST of the second bridge-arm unit 602.

The control circuit 603 is configured to generate the corresponding control signals to control a switching of the first and the third upper switch-elements (S1, S3) and the first and the second lower switch-elements (S2, S4) in response to an input voltage signal of the DC input-side IN (i.e. the DC input power Vin), an output voltage signal of the AC output-side OUT (i.e. the AC output power Vout) and inductor current signals of the inductors L1 and L2 (i.e. the detected inductor current signals $i_{L1}$ and $i_{L2}$).

In this exemplary embodiment, the control circuit 603 may be at least implemented by a digital signal processor (DSP), but not limited thereto. In other words, the control circuit 603 may be an analog circuit configuration. Moreover, the control circuit 603 controls the non-isolated inverter 60 under a critical inductor current mode (CRM).

In order to more clearly explain the principle of the circuit topology as shown in FIG. 6, FIGS. 7(a) to 7(d) are diagrams of the non-isolated inverter 60 of FIG. 6 in different operation modes. Referring to FIGS. 7(a) to 7(d), in the positive half cycle of the output current Io of the non-isolated inverter 60, the direction of the output current Io of the non-isolated inverter 60 is the same as that of the current $i_{L1}$ flowing through the inductor L1, and the current loops are respectively shown as the arrowed paths on FIGS. 7(a) and 7(b).

Figure 7:
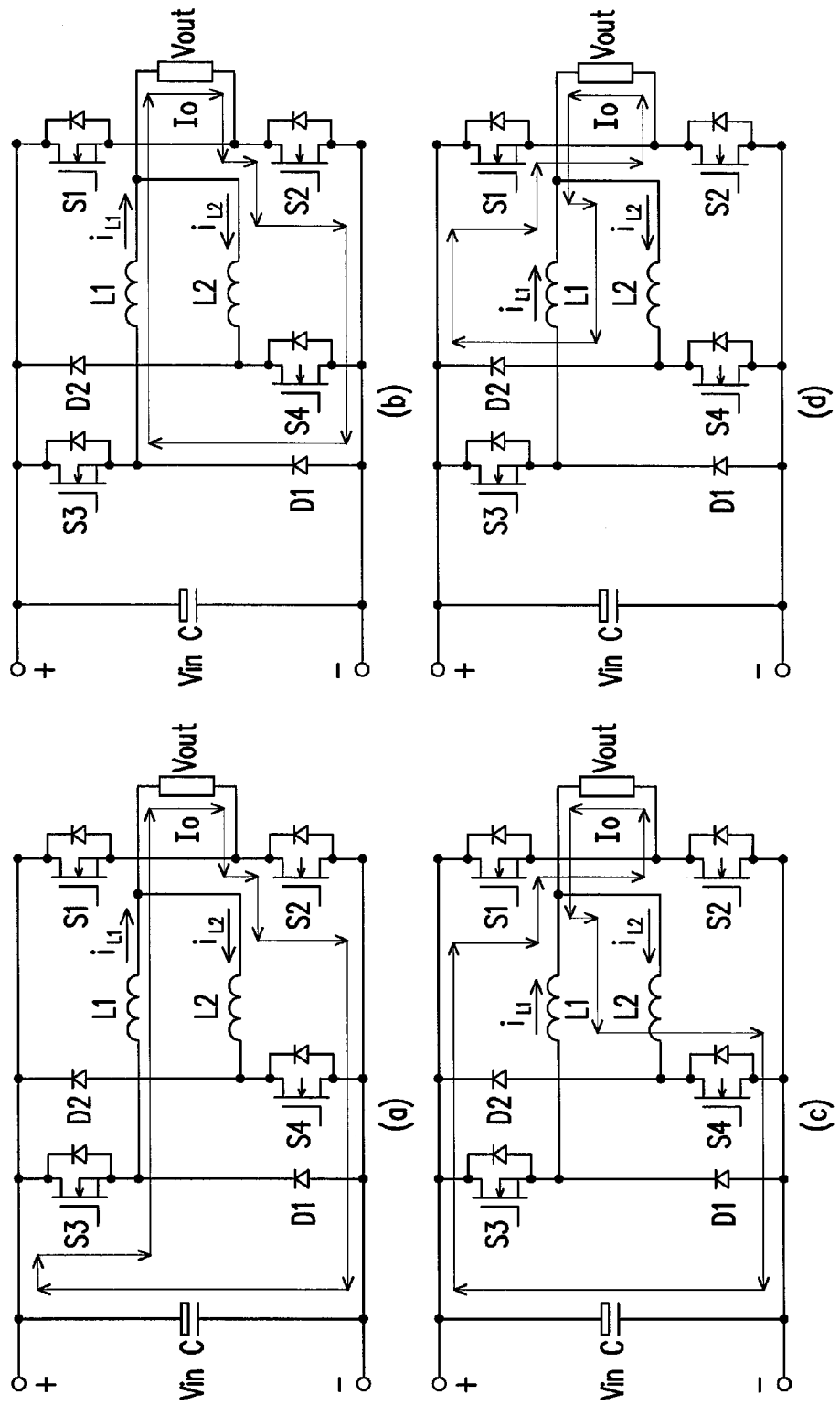
FIGS. 7(a) to 7(d) are diagrams of the non-isolated inverter 60 of FIG. 6 in different operation modes.

To be specific, as shown in FIG. 7(a), in the positive half cycle of the output current Io of the non-isolated inverter 60, the first lower switch-element S2 and the third upper switch-element S3 are turned on, and the first upper switch-element S1 and the second lower switch-element S4 are turned off, such that the current $i_{L1}$ of the inductor L1 is increased, the switch-elements (S3, D1) and the inductor L1 are operated as a buck circuit, and the switch-elements (S4, D2) does not work. Meanwhile, the current $i_{L2}$ flowing through the inductor L2 is zero, so the sinusoidal voltage waveform of the positive half cycle can be obtained by tracing the current $i_{L1}$ of the inductor L1. Moreover, as shown in FIG. 7(b), in the positive half cycle of the output current Io of the non-isolated inverter 60, the first lower switch-element S2 is turned on, and the other switch-elements (S1, S3, S4) are turned off, such that the current $i_{L1}$ of the inductor L1 is freewheeling through the third lower switch-element D1.

On the other hand, in the negative half cycle of the output current Io of the non-isolated inverter 60, the direction of the output current Io of the non-isolated inverter 60 is the same as that of the current $i_{L2}$ flowing through the inductor L2, and the current loops are respectively shown as the arrowed paths on FIGS. 7(c) and 7(d).

To be specific, as shown in FIG. 7(c), in the negative half cycle of the output current Io of the non-isolated inverter 60, the first lower switch-element S2 and the third upper switch-element S3 are turned off, and the first upper switch-element S1 and the second lower switch-element S4 are turned on, such that the current $i_{L2}$ of the inductor L2 is increased, the switch-elements (S4, D2) and the inductor L2 are operated as a buck circuit, and the switch-elements (S3, D1) does not work. Meanwhile, the current $i_{L1}$ flowing through the inductor L1 is zero, so the sinusoidal voltage waveform of the negative half cycle can be obtained by tracing the current $i_{L2}$ of the inductor L2. Accordingly, a non-isolated dual buck inverter can be implemented for obtaining a full sinusoidal output voltage. Moreover, as shown in FIG. 7(d), in the negative half cycle of the output current Io of the non-isolated inverter 60, the first upper switch-element S1 is turned on, and the other switch-elements (S2, S3, S4) are turned off, such that the current $i_{L2}$ of the inductor L2 is freewheeling through the second upper switch-element D2.

In this exemplary embodiment, the operation of the non-isolated inverter 60 is similar to that of the non-isolated inverter 10, such that the first upper switch-element S1 and the first lower switch-element S2 are respectively turned on in the positive and negative half cycles of the output current Io of the non-isolated inverter 60. Accordingly, the generation of common-mode currents (i.e. the leakage currents) in the non-isolated inverter 60 can be suppressed under a clamping action between the upper and lower switch-elements (S1, S2) due to there are no high-frequency voltages on the parasitic-capacitors from the non-isolated inverter 60 to the ground (or between the non-isolated inverter 60 and the ground).

Figure 8:
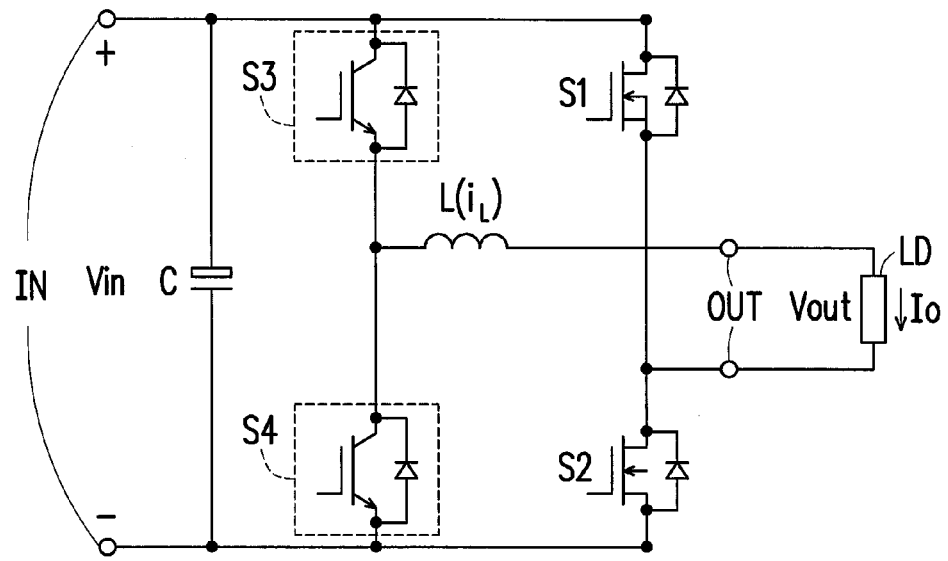
FIG. 8 is a diagram of a non-isolated inverter 10' according to a modification embodiment of the invention.
Figure 8:
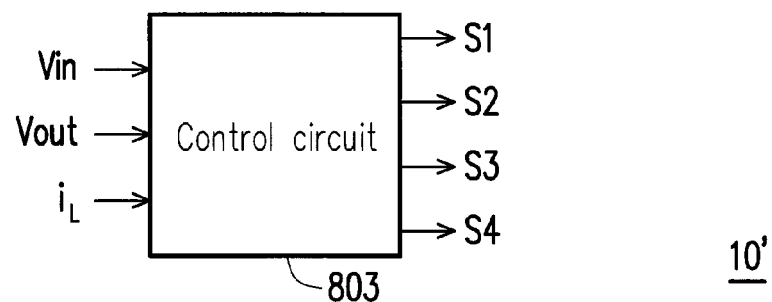

FIG. 8 is a diagram of a non-isolated inverter 10' according to a modification embodiment of the invention. Referring to FIGS. 1 and 8, as shown in FIG. 1, the switch-tubes corresponding to the second upper switch-element S3 and the second lower switch-element S4 have the characteristic of reverse recovery, so the current ($i_L$) flowing through the inductor L is not suitable for operating under the continuous mode (CCM). Accordingly, the difference between the non-isolated inverters 10 and 10' as shown in FIGS. 1 and 8 is that, as shown in FIG. 8, each of the switch-tubes corresponding to the second upper switch-element S3 and the second lower switch-element S4 are changed from the original MOSFETs each with body diode to a combination of an insulated gate bipolar transistor (IGBT) and a fast-recovery diode (for example, SiC diode) both connected in parallel.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-isolated inverter, comprising:
   a DC input-side;
   a capacitor, connected in parallel with the DC input-side;
   an AC output-side, connected in parallel with a load;
   a first bridge-arm unit, having an upper terminal connected to a first terminal of the capacitor, and a lower terminal connected to a second terminal of the capacitor, wherein the first bridge-arm unit comprises:
      a series forward-connection of a first upper switch-element and a first lower switch-element,
      wherein the series forward-connection of the first upper switch-element and the first lower switch-element is connected between the upper and the lower terminals of the first bridge-arm unit, and
      wherein a common-node of the first upper switch-element and the first lower switch-element is connected to a first terminal of the AC output-side;
   a second bridge-arm unit, having an upper terminal connected to the first terminal of the capacitor, a lower terminal connected to the second terminal of the capacitor, and a supplying terminal connected to a second terminal of the AC output-side, wherein the second bridge-arm unit comprises:
      a first set of second bridge-arm sub-unit having a series forward-connection of a second upper switch-element and a second lower switch-element and a first inductor, wherein the series forward-connection of the second upper switch-element and the second lower switch-element is connected between the upper and lower terminals of the second bridge-arm unit, and a common-node of the second upper switch-element and the second lower switch-element is connected to a first terminal of the first inductor, and a second terminal of the first inductor is connected to the supplying terminal of the second bridge-arm unit; and
   a control circuit, configured to control a switching of the first to the second upper switch-elements and the first to the second lower switch-elements in response to an input voltage signal of the DC input-side, an output voltage signal of the AC output-side and an inductor current signal of the first inductor,
   wherein in a positive half cycle of an output current of the non-isolated inverter, the first lower switch-element is turned on, and the first upper switch-element is turned off,
   wherein in a negative half cycle of the output current of the non-isolated inverter, the first upper switch-element is turned on, and the first lower switch-element is turned off,
   wherein a generation of common-mode currents in the non-isolated inverter is suppressed under a clamping action between the first upper switch-element and the first lower switch-element.

2. The non-isolated inverter according to claim 1, wherein:
   the first to the second upper switch-elements and the first to the second lower switch-elements are all switch-tubes; and
   the switch-tubes are implemented by controllable switches.

3. The non-isolated inverter according to claim 2, wherein each of the switch-tubes corresponding to the second upper switch-element and the second lower switch-element includes an insulated gate bipolar transistor (IGBT) and a fast-recovery diode both connected in parallel.

4. The non-isolated inverter according to claim 1, wherein the control circuit is at least implemented by a digital signal processor.

5. The non-isolated inverter according to claim 1, wherein the control circuit controls the non-isolated inverter under a critical inductor current mode (CRM).

6. The non-isolated inverter according to claim 5, wherein:
   in the positive half cycle of the output current of the non-isolated inverter, a current of the first inductor is increased when the first lower switch-element and the second upper switch-element are turned on, and the first upper switch-element and the second lower switch-element are turned off;
   in the positive half cycle of the output current of the non-isolated inverter, the current of the first inductor is decreased when the first and the second lower switch-elements are turned on, and the first and the second upper switch-elements are turned off;
   in the negative half cycle of the output current of the non-isolated inverter, the current of the first inductor is increased when the first upper switch-element and the second lower switch-element are turned on, and the first lower switch-element and the second upper switch-element are turned off; and
   in the negative half cycle of the output current of the non-isolated inverter, the current of the first inductor is decreased when the first and the second upper switch-elements are turned on, and the first and the second lower switch-elements are turned off.

7. The non-isolated inverter according to claim 1, wherein the second bridge-arm unit further comprises:
   a second set of second bridge-arm sub-unit, connected in parallel with the first set of second bridge-arm sub-unit, comprising:
      a series forward-connection of a third upper switch-element and a third lower switch-element; and
      a second inductor,
      wherein the series forward-connection of the third upper switch-element and the third lower switch-element is connected between the upper and lower terminals of the second bridge-arm unit,
      wherein a common-node of the third upper switch-element and the third lower switch-element is connected to a first terminal of the second inductor, and a second terminal of the second inductor is connected to the supplying terminal of the second bridge-arm unit.

8. The non-isolated inverter according to claim 7, wherein: the first to the third upper switch-elements and the first to the third lower switch-elements are all switch-tubes; and the switch-tubes are implemented by controllable switches.

9. The non-isolated inverter according to claim 8, wherein the control circuit is configured to control the switching of the first to the second upper switch-elements and the first to the second lower switch-elements and a switching of the third upper switch-element and the third lower switch-element in response to the input voltage signal of the DC input-side, the output voltage signal of the AC output-side and inductor current signals of the first and the second inductors.

10. A photovoltaic grid-connected system having the non-isolated inverter as claimed in claim 1.

11. A non-isolated inverter, comprising:
a DC input-side;
a capacitor, connected in parallel with the DC input-side;
an AC output-side, connected in parallel with a load;
a first bridge-arm unit, having an upper terminal connected to a first terminal of the capacitor, and a lower terminal connected to a second terminal of the capacitor, wherein the first bridge-arm unit comprises:
  a series forward-connection of a first upper switch-element and a first lower switch-element,
  wherein the series forward-connection of the first upper switch-element and the first lower switch-element is connected between the upper and the lower terminals of the first bridge-arm unit, and
  wherein a common-node of the first upper switch-element and the first lower switch-element is connected to a first terminal of the AC output-side;
a second bridge-arm unit, having an upper terminal connected to the first terminal of the capacitor, a lower terminal connected to the second terminal of the capacitor, and a supplying terminal connected to a second terminal of the AC output-side, wherein the second bridge-arm unit comprises:
  a first set of second bridge-arm sub-unit having a series forward-connection of a second upper switch-element and a second lower switch-element and a first inductor, wherein the series forward-connection of the second upper switch-element and the second lower switch-element is connected between the upper and lower terminals of the second bridge-arm unit, and a common-node of the second upper switch-element and the second lower switch-element is connected to a first terminal of the first inductor, and a second terminal of the first inductor is connected to the supplying terminal of the second bridge-arm unit; and
  a second set of second bridge-arm sub-unit, connected in parallel with the first set of second bridge-arm sub-unit, the second set of second bridge-arm sub-unit comprises a series forward-connection of a third upper switch-element and a third lower switch-element and a second inductor, wherein the series forward-connection of the third upper switch-element and the third lower switch-element is connected between the upper and lower terminals of the second bridge-arm unit, and a common-node of the third upper switch-element and the third lower switch-element is connected to a first terminal of the second inductor, and a second terminal of the second inductor is connected to the supplying terminal of the second bridge-arm unit; and a control circuit, configured to control a switching of the first and the third upper switch-elements and the first and the second lower switch-elements in response to an input voltage signal of the DC input-side, an output voltage signal of the AC output-side and inductor current signals of the first and the second inductors,
wherein in a positive half cycle of an output current of the non-isolated inverter, the first lower switch-element is turned on, and the first upper switch-element is turned off,
wherein in a negative half cycle of the output current of the non-isolated inverter, the first upper switch-element is turned on, and the first lower switch-element is turned off,
wherein a generation of common-mode currents in the non-isolated inverter is suppressed under a clamping action between the first upper switch-element and the first lower switch-element.

12. The non-isolated inverter according to claim 11, wherein the first upper switch-element and the first lower switch-element are switch-tubes, one of the second upper switch-element and the second lower switch-element and one of the third upper switch-element and the third lower switch-element are diodes, and the other one of the second upper switch-element and the second lower switch-element and the other one of the third upper switch-element and the third lower switch-element are switch-tubes.

13. The non-isolated inverter according to claim 12, wherein the second upper switch-element and the third lower switch-element are diodes, the second lower switch-element and the third upper switch-element are switch-tubes, and all of the switch-tubes are implemented by controllable switches.

14. The non-isolated inverter according to claim 11, wherein:
in the positive half cycle of the output current of the non-isolated inverter, a current of the second inductor is increased when the first lower switch-element and the third upper switch-element are turned on, and the first upper switch-element and the second lower switch-element are turned off;
in the positive half cycle of the output current of the non-isolated inverter, the current of the second inductor is freewheeling through the third lower switch-element when the first lower switch-element is turned on, and the first upper, the second lower and the third upper switch-elements are turned off;
in the negative half cycle of the output current of the non-isolated inverter, the current of the first inductor is increased when the first upper switch-element and the second lower switch-element are turned on, and the first lower switch-element and the third upper switch-element are turned off; and
in the negative half cycle of the output current of the non-isolated inverter, the current of the first inductor is freewheeling through the second upper switch-element when the first upper switch-element is turned on, and the first lower, the second lower and the third upper switch-elements are turned off.

* * * * *